Oct. 21, 1969     K. F. PARKER     3,473,808
GAME APPARATUS COMPRISING OPPOSITELY FACING PLAYING BOARDS
Filed Sept. 27, 1966     4 Sheets-Sheet 1
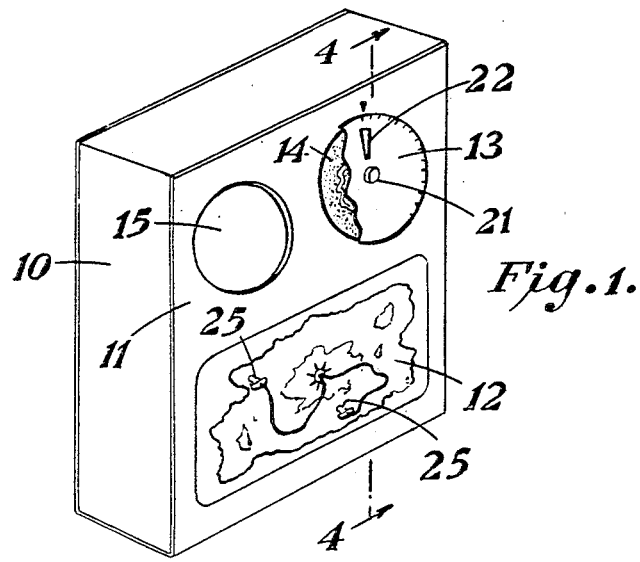
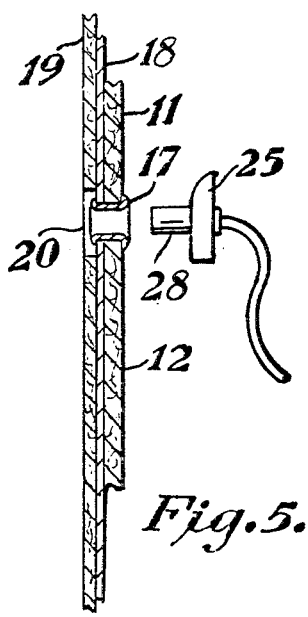
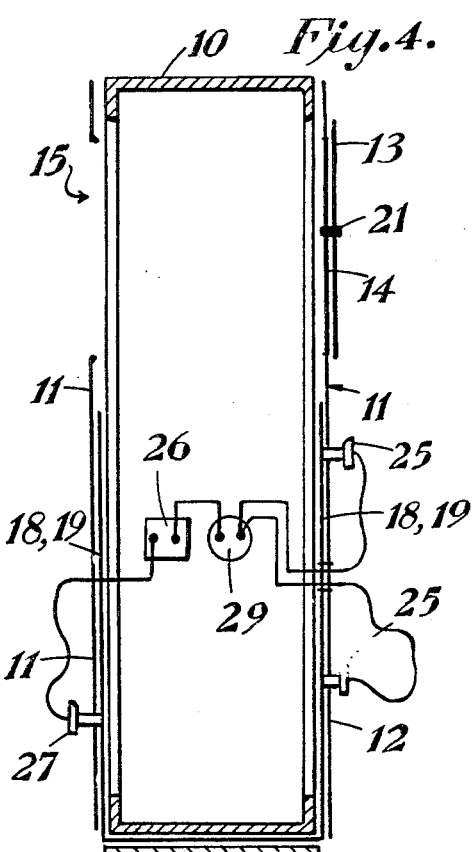
Inventor:
Kenneth Frederick Parker
By Baldwin, Wight, Diller & Brown
Attorneys Oct. 21, 1969 K. F. PARKER 3,473,808
GAME APPARATUS COMPRISING OPPOSITELY FACING PLAYING BOARDS
Filed Sept. 27, 1966 4 Sheets-Sheet 2

Inventor:
Kenneth Frederick Parker
By Baldwin, Wight, Viller & Brown
Attorneys

Oct. 21, 1969 K. F. PARKER 3,473,808
GAME APPARATUS COMPRISING OPPOSITELY FACING PLAYING BOARDS
Filed Sept. 27, 1966 4 Sheets-Sheet 3
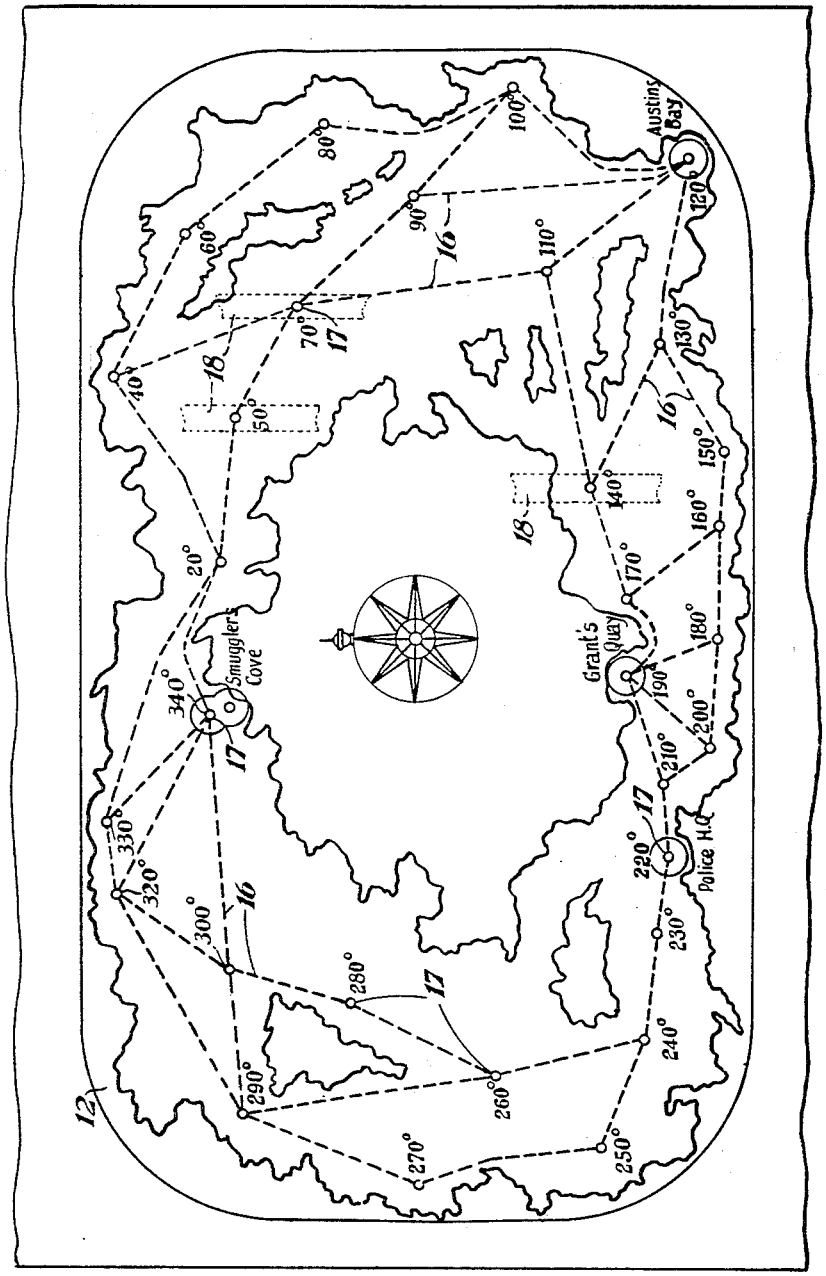
Inventor:
Kenneth Frederick Parker
BY Baldwin, Wight, Diller & Brown
Attorneys Oct. 21, 1969     K. F. PARKER     3,473,808
GAME APPARATUS COMPRISING OPPOSITELY FACING PLAYING BOARDS
Filed Sept. 27, 1966     4 Sheets-Sheet 4

Inventor:
Kenneth Frederick Parker
By Baldwin, Wight, Willer & Brown
Attorneys

United States Patent Office 3,473,808
Patented Oct. 21, 1969

3,473,808
GAME APPARATUS COMPRISING OPPOSITELY FACING PLAYING BOARDS
Kenneth Frederick Parker, Kenley, Honeysuckle Lane, Colwyn Bay, Wales
Filed Sept. 27, 1966, Ser. No. 582,379
Int. Cl. A63f 3/00
U.S. Cl. 273—131                                8 Claims

ABSTRACT OF THE DISCLOSURE

Apparatus for playing a game comprises two opposed plotting boards, each simulating a map having interconnected lines defining routes, and marker points arranged on the routes of each plotting board, the marker points being spaced apart and distributed over 360°, and the plotting boards being mirror images of each other. Corresponding marker points on the two plotting boards are electrically connected. Marker members are provided for connecting a battery and a signal device in circuit with connected marker points on said boards. A simulated compass on each board is operable manually to indicate the position of a marker member on its associated plotting board, and a simulated radar screen gives a visual indication of the marker point corresponding to the compass setting. Each compass has a slit adapted to expose sectors of the 360° successively to effect said position indicaton. Each simulated radar screen has a reduced scale reproduction of the associated plotting board and its marker points. Each radar screen is visible through an aligned opening in the opposed plotting board, successive sectors of the radar screen being rendered visible by rotation of the associated compass slit.

---

This invention relates to apparatus for playing a game of skill and is concerned with a so-called board game.

It is well known that most board games are played by moving markers over a set course or circuit according to the throw of dice, the board in this case being common and thus visible to all the players. It is also common practice, in order to increase the excitement of the game, to use cards or other identifying means to indicate penalties or rewards given to the owner of a marker which lands on certain predetermined squares or other markings setting out the course or circuit. It is also a well known fact that board games, with a few exceptions, are intended to be played by three or four or more players and that such games are seriously lacking in excitement if played by two players only.

It is among the objects of the present invention to provide a game apparatus embodying a unique combination of elements involving a new concept in board games for two players only, the game being played without the use of dice and being such that it is dependent upon the skill and integrity of the two players.

According to the present invention, apparatus for playing a game comprises two playing or plotting boards, each of which is marked, preferably on a background simulating a map, with a plurality of interconnected lines indicating routes, a plurality of marker points provided on said lines and/or at the junctions of said lines, marker members arranged to be moved between the marker points of each board, a simulated compass and a simulated radar screen associated with each playing or plotting board, and means for indicating when a marker member on one board is in a position corresponding to that of a marker member on the other board.

Preferably, each playing or plotting board is provided with a map, the lines marked thereon indicating sea routes or shipping lanes which are interconnected with one another and including points indicating certain sea ports in the area. The marker points of one board are connected electrically with the corresponding marker points on the other board and the marker members are each connected to a source of electric power, and to a visual or audible warning device, the arrangement being such as to cause actuation of the warning device when one marker of one board is positioned in a position identical to that of a marker of the other board.

The game, which will hereinafter be described, is based on the story of "The Caribbean Smugglers" who operate in the area of the Caribbean Sea. The smugglers operate from a secret hideout and are active among the islands of the Caribbean Sea, obtaining diamonds from the ports of Austins Bay and Grants Quay and smuggling them back to their home base at Smugglers Cove.

Figure 2:
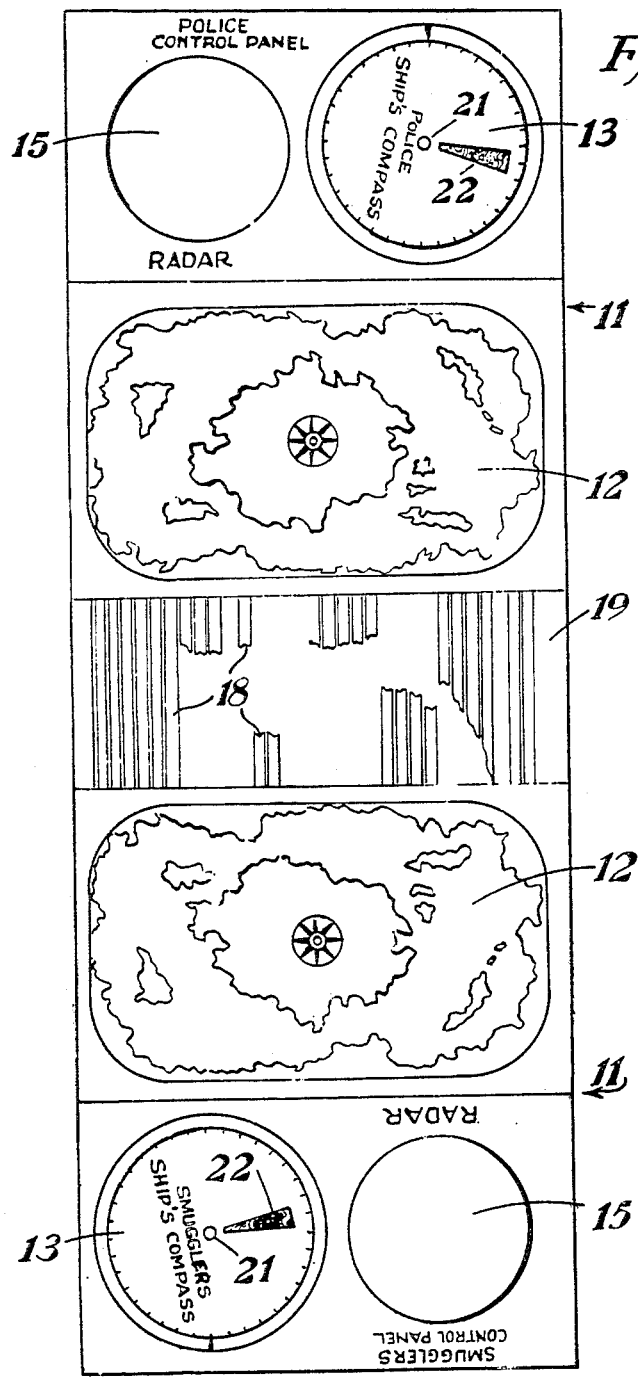
Figure 6:
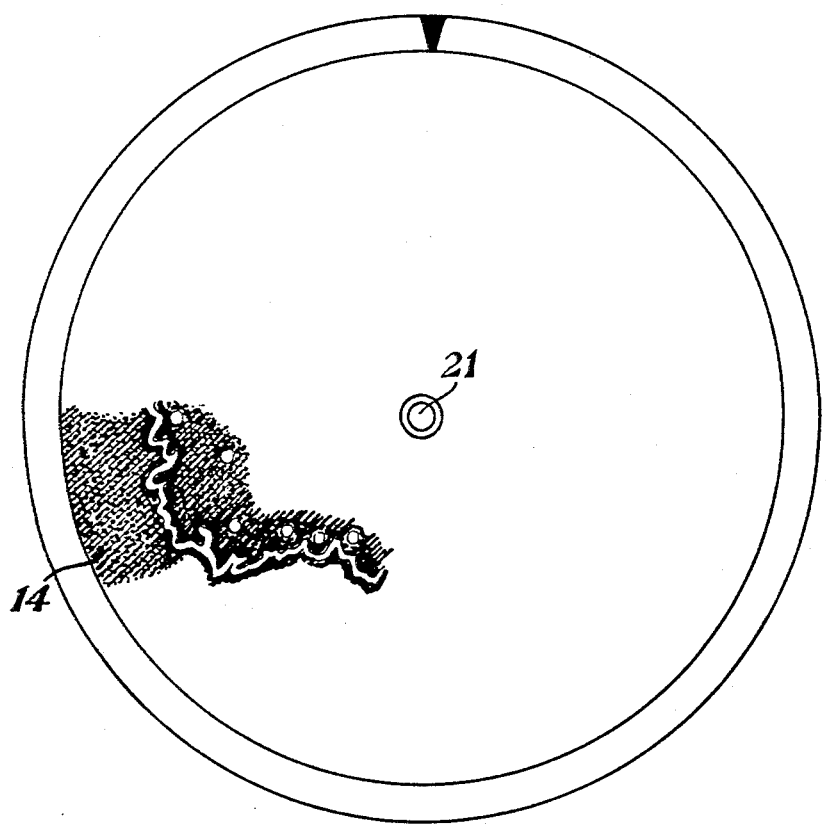

Apparatus for playing a game according to the invention is illustrated by way of example in the accompanying drawings, in which:

FIGURE 1 is a perspective view of one form of apparatus according to the invention, FIGURE 2 is a development of that part of the apparatus including the playing or plotting boards, the compasses, the radar screens and the main electric circuitry, FIGURE 3 is a plan view showing the layout of one of the playing or plotting boards, FIGURE 4 is a section on the line 4—4 of FIGURE 1, FIGURE 5 is a detail of part of FIGURE 4, and FIGURE 6 is a detail showing the radar screen.

Referring to the drawings, the apparatus comprises an open-sided box-like frame 10 on opposite sides of which are arranged side walls 11 presenting a playing or plotting board 12 in the form of a map, a compass 13, and a simulated radar secreen 14. The side walls 11 are also provided, at positions opposite each compass 13 and radar screen 14, with circular openings 15 through which the radar screens can be observed.

The side walls 11 also incorporate the main electric circuitry which is arranged and constructed as hereinafter described.

Each board 12 has marked on one surface thereof a map purporting to represent a groups of islands somewhere in the Caribbean Sea, giving an indication of certain ports which are to be used in the game, the ports being interconnected by lines 16 indicating a network of shipping routes extending over the area of the board. At eact route junction, and at each of said ports, there is provided a marker point 17 which may be in the form of a socket provided by a metal eyelet.

Each marker point 17 on one board 12, except those at the above mentioned ports, is in electrical connection with its corresponding marker point on the other board 12, which connection can be effected by insulated wires, or by means of a printed circuit, for example made up of aluminium or copper foil strips as indicated at 18.

The side walls 11 are first constructed in a flat or developed form as shown in FIGURE 2. This is effected by laying out a backing sheet 19 which is of a size equivalent to the two maps 12 plus the depth of the frame 10. The backing sheet is formed with holes 20 at positions corresponding to the marker points 17, the holes 20 being made slightly larger than the eyelets used to form the marker points. The strips 18 are then fixed to the backing sheet 19, for example by means of staples, in positions which correspond to and connect corresponding marker points on the two maps.

The two control panels, each including the map 12 and the compass 13, are mounted on the backing sheet 19, each of the strips 18 being sandwiched between the backing sheet and the control panels. The control panels are spaced apart a distance equivalent to the depth of the frame 10. For convenience, in order to simplify the electric circuitry, the two maps 12 are arranged so that one is the reverse of the other, i.e., a mirror image.

The backing sheet and the control panels are then joined together by fixing the eyelets in position at each of the marker points 17 as shown in FIGURE 5. In this respect, it will be seen that the eyelets are in direct contact with the strips 18, which is the reason for making the holes 20 in the backing sheet 19 larger than the eyelets.

After this, the radar screens 14, each of which consists of a map which is a one-third scale negative reproduction in circular form of a map 12, are secured in opposite positions over openings formed in the control panels. The radar screens are of stiff translucent material printed with translucent black so that the sea and land areas show as shadow and coastlines and points corresponding to the marker points 17 show as light, as is indicated in FIGURE 6.

With the radar screens in position, the compasses 13, which are in the form of a disc of warp-resistant opaque material, are fixed in position over the radar screens so that they can be turned about their centres 21.

Each of the compasses 13 is graduated at its circumference at, for example, 10° intervals and is also formed with a slit 22 which is in the form of a cut-out sector of approximately 10° extending between the centre 21 and a point near the circumference of the disc. Thus, it will be appreciated that the slit 22 is such as to allow the passage of light sufficient to illuminate a 10° sector of the radar screen 14. In this respect, the marker points 17 provided at each route junction, and at each port, are arranged so that they each fall somewhere across the map on one of a number of radii spaced apart 10° or a multiple of 10°, extending from the centre of the map, and each marker point has an indication to show the particular compass bearing on which it lies. In this latter respect, it will be obvious that, since one map is the reverse of the other, the compass readings will be arranged to suit each map separately. The marker points 17 are spaced from each other horizontally and successively as viewed in FIGURE 3 so that no two marker points lie on the same vertical line. In the illustrative embodiment, the spacing intervals is of the order of ⅜″.

The structure formed as described above is fixed to the frame 10 and a cover strip 24 is placed over the otherwise exposed strips 18 extending across the lower edge of the frame. Thus, it will be seen that the apparatus provides two maps 12 facing in opposite directions, one for use by the player taking the part of the smugglers and the other for use by the player taking the part of the police, and two so-called compasses 13 each having a co-acting simulated radar screen 14, one compass and radar screen facing in one direction for manual use by the player taking the part of the smugglers and visual use by the player taking the part of the police, and the other compass and co-acting radar screen facing in the opposite direction for manual use by the player taking the part of the police and visual use by the player taking the part of the smugglers.

The apparatus also includes, for use with one of the maps 12 to be used by the player acting the part of the smugglers, two markers 25 which represent the smugglers' boats and which are wired to a source of electric power, such as a battery 26, and one unwired marker (not shown) to plot the position of the police launch. In addition, for use with the other map 12 which is used by the player acting the part of the police, there is provided one wired marker 27 representing the police launch and two unwired markers (not shown) for plotting the positions of the smugglers' boats. The marker members are formed with a pin 28 which is provided to fit into the sockets forming the marker points 17.

Furthermore, a visual or audible warning device 29 is arranged within the frame 10 in circuit with the battery 26 and the wired markers 25, 27, which device becomes operative when the circuit is completed as hereinafter described.

It will be realised that it is essential that the two players do not see each other's playing maps and, in this respect, the frame 10 not only provides a mounting for maps 12, the radar screens 14 and the compasses 13 but also presents a wall between the two players.

The map is preferably marked with the following ports: Smugglers Cove, Police H.Q., Austins Bay and Grants Quay.

The object of the game is that the smugglers move with their two boats 25 from their hideout at Smugglers Cove to pick up a cargo of diamonds from either of the ports of Austins Bay and Grants Quay, and then return to their hideout without being boarded by the police who have one launch 27 which sets out from Police H.Q. The game is won by the police when they successfully board either of the smugglers' boats, whether it is carrying diamonds or not. For the smugglers to win it is necessary for only one of their boats to successfully obtain diamonds and return to base without either boat being boarded by the police.

In order to play the game, moves must follow the shipping lanes 16 marked on the map from the position originally occupied by the boat or launch, and each player is required to navigate his boat or launch by first deciding to which position he is going to move, after which he sets his compass 13 to the reading given at that position, and then moves to the chosen position. The reading shows up on the radar screen to give the other player an indication of the position of the boat or launch.

The smugglers make the first move from Smugglers Cove and this move is made with the smugglers' compass turned to a position for which no marker point is provided. The smugglers can only move one boat at a time (not necessarily alternately) and each alternate move is made with the compass set at said position having no marker point.

The police make their first move from Police H.Q. and must adjust their compass as described above before every move. However, due to the fact that the police have a fast launch, they are permitted to move one or two positions at a time as decided by them. In this respect, it will be understood that, where the police decide to move two positions, their compass setting must be made on the basis of the second position which is the final point to which they intend to move.

Thereafter, the smugglers and the police move alternately until the smugglers win or both players land on corresponding marker points 17, when the game ends. The effect of the police and the smugglers landing on corresponding marker points 17 is that an electric circuit to the buzzer 29 is completed via the battery 26 and the apppropriate strip 18, thereby giving an audible indication that one of the smugglers' boats has been boarded.

As previously stated, only the marker points on each board other than those at the ports of Austins Bay and Grants Quay are in electrical connection with the corresponding marker points on the other board. Therefore, there cannot be a boarding indication at either of these ports. However, to add to the excitement of the game, the smugglers must declare when they enter the port of Austins Bay or Grants Quay to pick up a cargo of diamonds, although in these positions they cannot be boarded. It will be appreciated, however, that the police can enter any port at which the smugglers' boat is positioned, should their move take them into that port.

During the game both the smugglers and the police use their unwired tracking markers to plot the positions of one another on the basis of the information given on their corresponding radar screen.

Although the invention has been described with reference to police and smugglers operating in the Caribbean Sea, it will be obvious that it is not limited in this respect. Thus, the map may cover any desired area whether it be a land area or a land and sea area, and the players may take the parts of any two recognised "enemies."

Furthermore, although the invention has been described with reference to the marker points 17 as being in the form of a socket to receive a pin formed on the marker members, it will be understood that any other means of electrical connection can be used, for example magnetic or other switches or co-operating metal plates on the board and the marker members.

In addition, it will be appreciated that, instead of using natural light, or ordinary room light, to illuminate the radar screens, electric lighting can be incorporated in the housing 10.

I claim:

1. Apparatus for playing a game, which comprises two oppositely facing plotting boards each of which is marked with a plurality of interconnected lines defining routes, a plurality of marker points provided on each of said plotting boards at least at the junctions of said interconnected lines, the two plotting boards including their route defining lines and their marker points being mirror images of each other, electrical conductor means extending between marker points on one plotting board and the corresponding marker points of the other plotting board, a simulated compass and a translucent simulated radar screen mounted one behind the other and associated with each of said plotting boards, each of said plotting boards having an opening positioned to enable viewing the simulated radar screen associated with the opposite board, each of said simulated radar screens having a reduced scale reproduction of the associated plotting board route defining lines and marker points, and each of said compasses being formed with a slit and being operable manually to position said slit in alignment with a selected part of the associated screen, and each of said radar screens providing a visual indication of the position of its co-acting compass, marker members adapted to be moved to selected marker points of each of said plotting boards, and means in electrical connection with said marker members for giving an indication when a marker member of one of said plotting boards is in a position corresponding to that of a marker member of the other of said plotting boards.

2. Apparatus for playing a game comprising a box-like structure, a plotting board arranged in each of two oppositely disposed side walls of said box-like structure, said plotting boards each being marked with a plurality of interconnected lines defining routes, a plurality of marker points provided on each of said plotting boards at least at the junctions of said interconnected lines, the two plotting boards including their route defining lines and their marker points being mirror images of each other, electrical conductor means extending between marker points of one plotting board and the corresponding marker points of the other plotting board, a simulated compass and a translucent simulated radar screen arranged one behind the other in association with each of said plotting boards in each of said oppositely disposed side walls, each of said simulated radar screens having a reduced scale reproduction of the associated plotting board route defining lines and marker points, and each of said compasses being formed with a slit and being operable manually to position said slit in alignment with a selected part of the associated screen, and each of said radar screens providing a visual indication of the position of its co-acting compass, an opening arranged in each of said side walls at positions opposite each of said simulated radar screens to permit said radar screens to be observed, marker members adapted to be moved to selected marker points of each of said plotting boards, and means in electrical connection with said marker members for giving an indication when a marker member of one of said plotting boards is in a position corresponding to that of a marker member of the other of said plotting boards.

3. Apparatus for playing a game comprising a box-like structure, a plotting board arranged in each of two oppositely disposed side walls of said box-like structure, said plotting boards each being marked with a plurality of interconnected lines defining routes, a plurality of electrically conducting sockets representing marker points provided on each of said plotting boards at least at the junctions of said interconnected lines, the two plotting boards including their route defining lines and their marker points being mirror images of each other, electrical conductor means extending between sockets of one plotting board and the corresponding sockets of the other plotting board, a simulated compass and a translucent simulated radar screen arranged one behind the other in association with each of said plotting boards in each of said oppositely disposed side walls, each of said simulated radar screens having a reduced scale reproduction of the associated plotting board route defining lines and marker points, each of said compasses being formed with a slit and being operable manually to position said slit in alignment with a selected part of the associated screen, and each of said radar screens providing a visual indication of the position of its co-acting compass, an opening arranged in each of said side walls at positions opposite each of said simulated radar screens to permit said radar screens to be observed, marker members each having an electrically conducting projecting pin adapted to be removably inserted into said sockets, and means in electrical connection with said pins for giving an indication when a pin on one of said plotting boards is in a position corresponding to that of a pin of the other of said plotting boards.

4. Apparatus for playing a game comprising a box-like structure, a plotting board arranged in each of two oppositely disposed side walls of said box-like structure, said plotting boards each being marked with a plurality of interconnected lines defining routes, a plurality of electrically conducting sockets representing marker points provided on each of said plotting boards at least at the junctions of said interconnected lines, the two plotting boards including their route defining lines and their marker points being mirror images of each other, a simulated compass and a translucent simulated radar screen arranged one behind the other in association with each of said plotting boards in each of said oppositely disposed side walls, each of said plotting boards having an opening positioned to enable viewing the simulated radar screen in the opposite wall, each of said simulated radar screens having a reduced scale reproduction of the associated plotting board route defining lines and marker points, and each of said compasses being formed with a slit and being operable manually to position said slit in alignment with a selected part of the associated screen, and each of said radar screens providing a visual indication of the position of its co-acting compass, each of said sockets of one of said plotting boards being in electrical connection with its corresponding socket of the other of said poltting boards, marker members each having an electrically conducting projecting pin adapted to be removably inserted into said sockets, and a warning device, each plotting board having at least one marker member in electrical connection with said warning device, whereby when the pin of a marker member of one of said plotting boards is in a socket corresponding to that which contains the pin of a marker member of the other of said plotting boards, an electrical circuit to said warning device is completed to operate said warning device.

5. Apparatus for playing a game comprising a box-like structure, a plotting board arranged in each of two oppositely disposed side walls of said box-like structure, said plotting boards each being marked with a plurality of interconnected lines defining routes, a plurality of electrically conducting sockets representing marker points provided on each of said plotting boards at least at the junctions of said interconnected lines, the two plotting boards including their route defining lines and their marker points being mirror images of each other, a simulated compass and a translucent simulated radar screen arranged one behind the other in association with each of said plotting boards in each of said oppositely disposed side walls, each of said plotting boards having an opening positioned to enable viewing the simulated radar screen in the opposite wall, each of said simulated radar screens having a reduced scale reproduction of the associated plotting board route defining lines and marker points, and each of said compasses being formed with a slit and being operable manually to position said slit in alignment with a selected part of the associated screen, and each of said radar screens providing a visual indication of the position of its co-acting compass, each of said sockets of one of said plotting boards being in electrical connection via a metallic strip with its corresponding socket of the other of said plotting boards, marker members each having an electrically conducting projecting pin adapted to be removably inserted into said sockets, and a warning device, each plotting board having at least one marker member connected by a flexible conductor wire to said warning device, whereby when the pin of a marker member of one of said plotting boards is in a socket corresponding to that which contains the pin of a marker member of the other of said plotting boards, an electrical circuit to said warning device is completed via the associated metallic strip to operate said warning device.

6. Apparatus as claimed in claim 5, in which each of said compasses comprises a circular disc which is mounted over its co-acting radar screen and is adapted to be turned about its centre, said compass slit extending radially with respect to said disc and being of sector shape.

7. Apparatus as claimed in claim 5, in which each of said compasses comprises a circular disc which is mounted over its co-acting radar screen and is adapted to be turned about its centre, said disc being formed with a radially disposed sector-shaped slit to expose a portion of said radar screen.

8. Apparatus as claimed in claim 1 in which the backgrounds of said plotting boards simulate maps which are mirror images of each other.

References Cited

UNITED STATES PATENTS

| | | |
|---|---|---|
| 2,399,811 | 5/1946 | Krassilnikoff. |
| 2,575,269 | 11/1951 | Hall _____ 273—130 |
| 2,905,473 | 9/1959 | Giannotti _____ 273—130 |

FOREIGN PATENTS

| | | |
|---|---|---|
| 534,452 | 1/1955 | Belgium. |
| 424,211 | 3/1911 | France. |
| 1,173,335 | 10/1958 | France. |
| 1,431,792 | 2/1966 | France. |

DELBERT B. LOWE, Primary Examiner

U.S. Cl. X.R.

273—136